(12) United States Patent
Busse et al.

(10) Patent No.: US 6,267,073 B1
(45) Date of Patent: Jul. 31, 2001

(54) APPARATUS FOR PREPARING PATTERNED CONFECTIONS

(75) Inventors: Kurt A. Busse, Radnor; Edward Morris Kuehl; William French, both of Dublin, all of OH (US)

(73) Assignee: Nestec, S.A., Vevey (CH)

( * ) Notice: Subject to any disclaimer, the term of this patent is extended or adjusted under 35 U.S.C. 154(b) by 0 days.

(21) Appl. No.: 09/145,739

(22) Filed: Sep. 2, 1998

Related U.S. Application Data

(63) Continuation-in-part of application No. 08/901,727, filed on Jul. 28, 1997, now abandoned.

(51) Int. Cl.[7] .................................................. B05C 5/02
(52) U.S. Cl. ............................. 118/24; 118/13; 118/14; 118/25; 118/DIG. 16
(58) Field of Search ................................. 426/100, 101, 426/303–307, 249; 99/450.1, 516; 118/13, 14, 24, 25, 323, 313, DIG. 16, 50, 62–64; 239/223, 224

(56) References Cited

U.S. PATENT DOCUMENTS

| | | |
|---|---|---|
| 615,191 | 11/1898 | Lembke . |
| 1,470,524 | 9/1923 | Burt . |
| 1,777,896 | 10/1930 | Rossi . |
| 1,865,097 | 6/1932 | Gilham . |
| 2,246,871 | 6/1941 | Balch ...................................... 107/54 |
| 2,288,970 | 7/1942 | Weisbender ............................ 99/137 |
| 2,418,190 | 4/1947 | Overland ................................ 107/54 |
| 2,457,110 | 12/1948 | Burbank et al. ........................ 99/134 |
| 2,570,031 | 10/1951 | Gibson ................................... 99/137 |
| 2,646,757 | 7/1953 | Hackmann .............................. 107/1 |
| 2,774,314 | 12/1956 | Moser ..................................... 107/1 |
| 3,091,194 | 5/1963 | Dickinson ............................. 107/54 |
| 3,230,906 | 1/1966 | MacManus . |
| 3,285,202 | 11/1966 | MacManus . |
| 3,288,052 * | 11/1966 | Hough ..................................... 118/24 |
| 3,427,650 * | 2/1969 | Woody .................................... 118/13 |
| 3,545,981 | 12/1970 | Klein et al. ............................ 99/138 |
| 3,556,022 | 1/1971 | Westin .................................. 107/54 |
| 3,572,256 * | 3/1971 | Westin .................................. 118/24 |
| 3,690,896 | 9/1972 | Maxwell ................................. 99/81 |
| 3,770,460 | 11/1973 | Vroman ................................ 426/279 |
| 3,818,859 * | 6/1974 | Kalmar ........................ 118/DIG. 16 |
| 3,971,853 | 7/1976 | Crowder .............................. 426/249 |
| 4,105,801 | 8/1978 | Dogliotti ............................... 426/99 |
| 4,189,502 | 2/1980 | Rubenstein .......................... 426/249 |
| 4,200,658 | 4/1980 | Katzman et al. .................... 426/512 |
| 4,369,200 | 1/1983 | Iwao et al. ........................... 426/660 |
| 4,382,968 | 5/1983 | Akutagawa .......................... 426/249 |
| 4,421,773 | 12/1983 | Akutagawa .......................... 426/249 |
| 4,477,473 | 10/1984 | Schoonmaker et al. ............. 426/231 |
| 4,563,358 | 1/1986 | Mercer et al. ......................... 426/89 |
| 4,587,128 | 5/1986 | Cummings .......................... 426/303 |
| 4,758,143 | 7/1988 | Lopes ..................................... 425/91 |
| 4,778,683 | 10/1988 | Newsteder .......................... 426/249 |
| 4,873,104 | 10/1989 | Butcher et al. ..................... 426/249 |
| 4,910,661 | 3/1990 | Barth et al. ...................... 364/167.01 |
| 4,986,080 | 1/1991 | Grigoli et al. ......................... 62/75 |
| 5,019,404 | 5/1991 | Meisner ............................... 426/249 |
| 5,229,149 | 7/1993 | Cone ..................................... 426/91 |
| 5,248,338 | 9/1993 | Price .................................... 106/712 |
| 5,256,426 | 10/1993 | Tomioka et al. .................... 426/100 |
| 5,343,710 | 9/1994 | Cathenaut et al. ..................... 62/71 |

(List continued on next page.)

*Primary Examiner*—Laura Edwards
(74) *Attorney, Agent, or Firm*—Pennie & Edmonds LLP

(57) ABSTRACT

An apparatus and process for preparing chocolate coatings having a marbled appearance, and confectionery products having a component provided with a chocolate coating having a marbled appearance thereon.

22 Claims, 7 Drawing Sheets

(3 of 7 Drawing Sheet(s) Filed in Color)

U.S. PATENT DOCUMENTS

| | | | |
|---|---|---|---|
| 5,374,436 | 12/1994 | White et al. | 426/249 |
| 5,435,143 | 7/1995 | Heinrich | 62/75 |
| 5,447,036 | 9/1995 | Heinrich | 62/75 |
| 5,480,664 | 1/1996 | Ferrero | 426/307 |
| 5,516,540 | 5/1996 | Cathenaut | 426/249 |
| 5,582,856 | 12/1996 | White et al. | 426/249 |
| 5,720,175 | 2/1998 | White et al. | 62/76 |
| 5,891,246 * | 4/1999 | Lund | 118/DIG. 16 |
| 5,951,766 * | 9/1999 | Miller | 118/24 |

* cited by examiner

APPARATUS FOR PREPARING PATTERNED CONFECTIONS

CROSS REFERENCE TO RELATED APPLICATIONS

This application is a continuation-in-part of application Ser. No. 08/901,727, filed Jul. 28, 1997, now abandoned.

FIELD OF THE INVENTION

The present invention relates to an apparatus for preparing a chocolate confection having a marbled appearance.

BACKGROUND OF THE INVENTION

It has not been possible heretofore to produce chocolate coatings having a marbled appearance formed from two layers of chocolate, principally because there is only a very short time period within which the second layer must be applied to the first layer in order to achieve satisfactory adherence. The chocolate layers are usually applied in liquid, semi-liquid, or paste form either by spraying, pouring, dipping, or pressing in a cold environment. Generally, this procedure results in the first layer glazing over to form a frost of condensation shortly after application thereof (less than 30 seconds), which prevents the second liquid layer from adhering properly.

Several references disclose different types of chocolate or other edible coatings having the adherence problems discussed above. For example, U.S. Pat. No. 1,777,896 discloses an edible container shaped like a log made by spreading a plastic edible coating on the outside of a cylinder, adding bonbons to simulate branch stubs, and covering with a second layer of chocolate in a semi-liquid or plastic state.

U.S. Pat. No. 1,865,097 discloses hollow candy bodies made of chocolate having areas of the body formed with a color contrasting with the color of a major portion of the body. The hollow candy body may be prepared by chilling a dark chocolate in a portion of a mold, closing the mold and filling the mold with a light color chocolate, and chilling the mold again to form the light chocolate body overlaid by dark chocolate patches.

U.S. Pat. No. 2,288,970 discloses a confectionery such as ice cream having a coating of chocolate or other edible composition. In particular, the coating is provided with line formations or perforations that are pressed into the coating to control and limit the separation of coating from the confectionery product.

U.S. Pat. No. 2,457,110 discloses a method of coating chocolate edibles by dip-coating the edible in a coating of sufficiently low viscosity without the addition of cocoa butter. The chocolate is disclosed to be non-flowing at high temperatures due to the lack of cocoa butter in the composition during the dipping.

U.S. Pat. No. 3,971,853 discloses a frozen confection having a plurality of ingredients of individual colors, as well as a gravity feed arrangement for feeding a plurality of nozzles with the individually-colored ingredients so as to facilitate greater distribution of the ingredients.

U.S. Pat. No. 4,189,502 discloses marshmallow and other variegates having the ability to maintain a clear and distinct line of demarcation or delineation with a frozen dessert matrix into which the variegate is incorporated.

U.S. Pat. No. 4,369,200 discloses a method for producing three-dimensional decorations of a fatty confectionery material on a base confectionery, such as with a nozzle attached to a compressible bag for depositing the decorations. The deposition preferably occurs from a rotary sprayer, which deposits the decoration by use of a plurality of recesses in a mold.

U.S. Pat. No. 4,587,128 discloses a method of making an iced piece of cake and providing good adhesion between the icing coating and the cake by adding a bonding layer to a cake, applying the icing, completely enrobing it with a chocolate layer, cooling and solidifying the chocolate layer, and subsequently decorating the top and sides by pressing thereon "squiggles" having a different color.

We have now devised an apparatus and methods for obtaining chocolate coatings having a marbled appearance, as well as confectionery or ice cream products having a coating formed thereon from two layers of chocolate, whereby the second layer adheres satisfactorily to the first layer.

SUMMARY OF THE INVENTION

The present invention relates to a chocolate coating apparatus including at least one feed device for supplying chocolate; a positioning device for receiving the chocolate from each feed device and for directing the chocolate onto a confectionery in a desired arrangement as a coating; and an enclosure for recirculating chocolate that does not remain on the confectionery.

In one embodiment, the apparatus further includes at least one powered device for rotating each coating positioning device at a desired speed. In another embodiment, two feed devices are used for supplying two different types of chocolate. In yet another embodiment, the positioning device is located within the enclosure and includes at least one rotatable disk. In a preferred embodiment, each rotatable disk has a substantially ellipsoidal or substantially circular shape.

In another embodiment, the positioning device includes at least one rotatable pipe. In yet another embodiment, the positioning device includes a rotatable cup having a plurality of apertures for directing the chocolate onto the confectionery. In a preferred embodiment, the positioning device includes an overflow channel to facilitate recirculation of chocolate coating that does not pass through the apertures. In another embodiment, the positioning device further includes a metering device to control the output of chocolate coating. In a preferred embodiment, the positioning device includes a divider to maintain the separation of different chocolate types for application to the confectionery.

In one embodiment, the positioning device is rotated at a speed of about 50 rpm to 2,500 rpm. In another embodiment, the positioning device provides a discontinuous flow of chocolate. In yet another embodiment, the apparatus further includes a coating modifying device for blowing an air stream onto the chocolate coating to modify its appearance. In another embodiment, the apparatus further includes a coating modifying device for dragging at least one probe across the chocolate coating for forming surface impressions to give random or streaked effects on the coating. In yet another embodiment, the enclosure is heated to maintain the chocolate at a temperature from about 28° C. to 60° C., thereby facilitating application and recirculation of the chocolate.

The invention also relates to a chocolate coating apparatus including feed means for supplying chocolate; positioning means for receiving the chocolate from the feed means and for directing the chocolate onto a confectionery in a desired arrangement as a coating; and recirculation means for recirculating chocolate that does not remain on the confectionery.

In one embodiment, the feed means supplies two different types of chocolate coatings without combining the two coatings. In another embodiment, the positioning means includes a disk to facilitate directing the chocolate onto the confectionery. In yet another embodiment, the positioning means includes a cup having apertures therein to facilitate directing the chocolate onto the confectionery. In another embodiment, the positioning means includes a pipe having apertures therein to facilitate directing the chocolate onto the confectionery. In another embodiment, the recirculation means includes an enclosure disposed about the positioning means to contain the chocolate therein.

BRIEF DESCRIPTION OF THE DRAWINGS

The file of this patent contains at least one drawing executed in color. Copies of this patent with color drawings will be provided by the Patent & Trademark Office upon request and payment of the necessary fee.

DETAILED DESCRIPTION OF THE INVENTION

Figure 1:
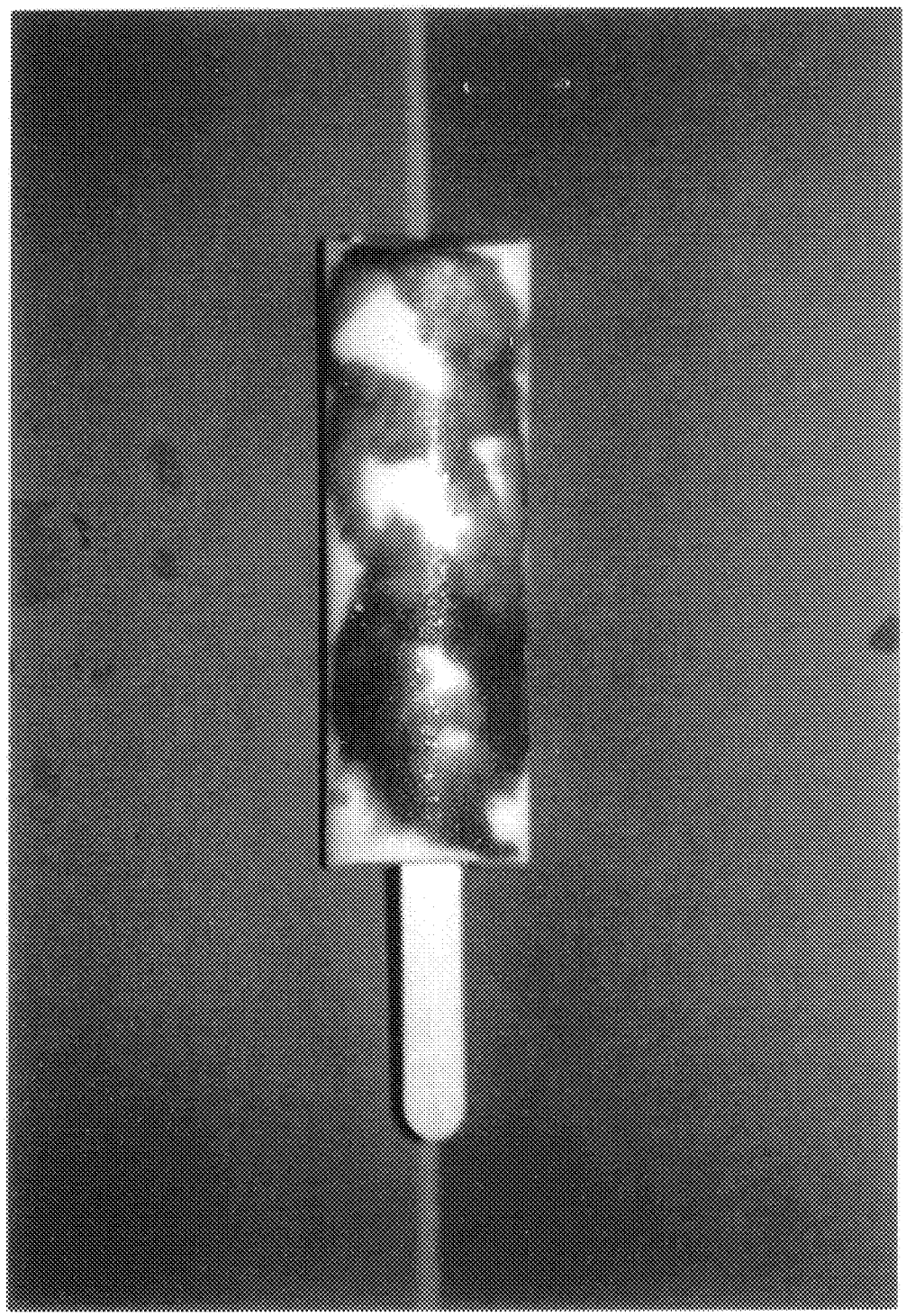
FIG. 1 is a plan view of the present invention.

The present invention advantageously provides an apparatus for applying a chocolate coating to a confectionery in a pattern to provide a desired appearance. The chocolate coating preferably includes more than one type of chocolate, especially two types of chocolate. Advantageously, the chocolate coating is formed from two layers of chocolate. The chocolate layers may be continuous or discontinuous. Preferably, the layers of the chocolate coating formed from two layers of chocolate are formed from different chocolates and more especially from chocolates of different colors. Also, two chocolate layers having different textures or appearances can be used, e.g., plain chocolate, milk chocolate, or white chocolate. Coatings in which one layer includes either milk or plain chocolate and the other layer includes white chocolate are the most interesting visually because there may be a marked contrast between the darker colored, milk, or plain chocolate, and the white chocolate. Each layer of chocolate has a thickness of from, for example, about 0.1 mm to 2 mm, preferably from about 0.25 mm to 1.5 mm and more preferably from about 0.5 mm to 1.0 mm.

The chocolate may be, for instance, ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter or any mixture thereof, nut pastes such as peanut butter and fat; praline; confectioner's coatings used for covering cakes usually comprising chocolate analogues with cocoa butter replaced by a cheaper non-tempering fat; or CARAMAC, a mixture of non-cocoa butter fats, sugar, and milk sold by Nestlé.

The confectionery or ice cream product that is coated with the coating having a marbled appearance may be, for instance, ice cream or any other confectionery product which may conventionally be coated with chocolate, e.g., praline, cake, fondant, water ice, sherbet, or other filling. The term "marbled" as used herein includes, but is not limited to, random, symmetrical, or geometric patternation in various forms, such as linear marbling, blown marbling, cross-hatching, pin-striping, or the like, wherein the marbling on each coated product contains substantially the same amount of chocolate coating. The design of the apparatus described herein will primarily dictate the type of marbled appearance on the confectionery or confectionery product being coated.

The coating may have the appearance of a dipped bar with a generally linear marbled effect, a blown bar with a less linear marbled effect, drizzle with a roughly continuous stripe, or splatter with a roughly discontinuous stripe. Although each of these are desired arrangements of the chocolate coating according to the invention, it should be understood that any design incorporating these or other arrangements may be provided to the chocolate coating.

The present invention also provides a process for preparing a chocolate coating having a marbled appearance which comprises laying strips of liquid chocolate across a mold, modifying the surface or configuration of the strips and solidifying the chocolate.

The mold used to prepare chocolate coatings having a marbled appearance may be any suitable conventional confectionery mold, such as a polycarbonate mold having the appropriate design. The strips of chocolate may be laid, preferably in a random manner on the mold, by means of one or more nozzles through which the chocolate flows. The diameter of the openings of the nozzles may be from about 1 to 4 mm and preferably from about 2 to 3 mm. The strips may be only one type of chocolate, but preferably include two or more types of chocolate. The surface or configuration of the strips may be modified by either an air stream blowing onto the surface or by dragging one or more probes across the surface to give random or streaked effects forming surface impressions. Following the modification of the surface or configuration of the strips, and preferably before any significant degree of solidification of the strips occurs, the mold may be filled with an appropriate chocolate and afterwards shelled by conventional confectionery techniques. Finally, a filling, e.g., ice cream, and if desired, a stick, or other article for handling the final product may be added. Alternatively, two corresponding halves of the strips may be joined together with or without a seal, with the filling and optional handling article being added either before or after joining the two halves.

The present invention also provides a process for preparing a confectionery or ice cream product provided with a chocolate having a dipped generally linear marbled appearance formed from two chocolates which comprises applying two chocolates simultaneously onto the confectionery or ice cream product by dipping, enrobing or spraying to coat the confectionery or ice cream product with a layer of coating of the two different chocolates simultaneously and solidifying the coating.

One process for preparing a confectionery or ice cream product provided with a chocolate having a dipped, generally linear marbled appearance formed from two chocolates includes dosing two chocolates simultaneously into a container, and then dipping the confectionery or ice cream product into the container to coat the confectionery or ice cream product with a layer of coating of the two different chocolates simultaneously, withdrawing the coated confectionery or ice cream product from the container and solidifying the coating.

A confectionery or ice cream product with a chocolate coating having a blown marbled appearance may be prepared by a modification of the process for preparing a confectionery or ice cream product with a chocolate coating having a dipped generally linear marbled appearance by blowing air across the coated confectionery or ice cream product, e.g., if the coating is applied by dipping as the coated confectionery or ice cream product exits the container and solidifying the coating. The air may be, for example, compressed air.

Preferably, the container has a shape that closely follows the contour and volume of the confectionery or ice cream product. The two chocolates are preferably dosed through the bottom of the container. The first chocolate advantageously differs from the second chocolate, e.g., one chocolate is plain or milk and the other is white. Various ratios of the two chocolate layers may be used to achieve different effects.

The present invention also provides a process for preparing a confectionery or ice cream product with a chocolate coating having a drizzle appearance with a roughly continuous stripe formed from two layers of chocolate that includes applying a first chocolate to the confectionery product by enrobing, spraying or dipping to coat the confectionery product with a first layer of chocolate, and then projecting a continuous stream of a second chocolate randomly past the coated confectionery product and solidifying the coating.

One example of a process for preparing a confectionery or ice cream product with a chocolate coating having a drizzle appearance with a roughly continuous stripe formed from two layers of chocolate includes dipping the confectionery or ice cream product into a first chocolate within a container to coat the confectionery or ice cream product, withdrawing the coated confectionery or ice cream product from the container and then projecting a continuous stream of a second chocolate randomly past the coated confectionery product and solidifying the coating.

The present invention also provides a process for preparing a confectionery product with a chocolate coating having a splatter appearance with a roughly discontinuous stripe formed from two layers of chocolate which includes applying a first chocolate to the confectionery product by enrobing, spraying or dipping to coat the confectionery product with a first layer of chocolate, and then projecting a discontinuous stream of a second chocolate randomly past the coated confectionery product by interrupting the flow of the second chocolate and solidifying the coating.

The above processes for preparing a confectionery product with a chocolate coating having a drizzle or a splatter appearance may be accomplished by the projection of the continuous or discontinuous stream of the second chocolate may be carried out by moving spray nozzles or by means of centrifugal force of a spinning device. The nozzles may be operated by a pump generating a pressure of from, e.g., about 50 to 150 psi, and preferably from about 75 to 125 psi. The second chocolate may be fed on to the upper surface of the spinning device. The spinning device is preferably a disk. The disk is preferably elliptical in shape and the flat surface may advantageously be inclined from the horizontal, e.g., up to about 30° and preferably from about 5° to 25°.

In an advantageous embodiment of the present invention, a confectionery product with a chocolate coating having the appearance of either stripes or spots may be obtained by applying a first chocolate to the confectionery product by enrobing, spraying or dipping to coat the confectionery product with a first layer of chocolate, and then passing the confectionery product between the opposing faces of a pair of spinning disks from which are projected streams of a second chocolate by centrifugal force onto the coated confectionery product, and then solidifying the coating. The second chocolate may be applied to the spinning disks by pumping the chocolate through tubing, e.g., stainless steel, onto the spinning disks.

The spinning disks may be made of one or more materials that may safely contact edible products, but are preferably metal to provide durability, and more preferably stainless steel. The disks may be substantially circular or elliptical and may be of various sizes. It is possible for one disk to have a different shape or size than the other disk of the pair. The disks are preferably inclined to one another, e.g., up to an angle of about 45° and preferably from about 25° to 35° to the axis of conveyance of the confectionery product. Advantageously, the inclination is arranged such that the edges of the disks downstream of the direction of conveyance of the confectionery product are closer than the edges of the disks upstream of the direction of conveyance of the confectionery product.

The disks are preferably mounted facing the front and rear center of the bars. Each bar may be passed, for example, vertically or horizontally between the disks. The spinning of the disks may be achieved, for instance, by a variable drive motor for each disk or one or more motors and a timing belt. Any suitable rotating means may be used for spinning the disks. The design on the confectionery product may be arranged by altering the speed of the spinning disks. The speed of the disks is preferably at least about 50 rpm and may be up to about 2500 rpm or more, depending on the space constraints dictated by the machine on which the product is to be made. The speed on the disk which produces stripes or spots is a function of the distance between the disk and the product to be coated. The spinning disks may be mounted inside a jacketed tank heated above the melting point of the chocolate, preferably from about 35° to 45° C., by circulating heated water. The tank may be made of any suitable material, such as a metal, and is preferably stainless steel. The heated jacket enables the excess chocolate that has been projected by centrifugal force from the spinning disks, after coating the confectionery product with the second chocolate, to hit the inside of the tank in a liquid form and then exit the tank for recirculation.

The chocolate coating may also be applied to the confectionery or ice cream product in the apparatus in various ways, for example by spraying or pouring the coating from the disks onto the product, by dipping the product into the coating stream, or by passing the product through the apparatus, such as on a conveyor belt. Extruded stick products and cake products are particularly suitable for passing through the apparatus, while enrobing or dipping are more suitable for preparing the coating on ice cream products. The relative motions of the apparatus and the product to be coated may be altered by one of ordinary skill in the art to help obtain the desired pattern on the coated product. Different embodiments of the apparatus, such as using cups or pipes in place of the disks, are discussed in more detail below.

In all the above processes for preparing a confectionery or ice cream product with a chocolate coating having a marbled appearance, the chocolate used may be tempered or untempered chocolate, is liquid, and the melting temperature may be from about 28° C. to 60° C., preferably from about 35° C. to 45° C.

EXAMPLES

The apparatus of the invention is further defined by reference to the following examples describing in detail the preparation of the compounds in the apparatus disclosed herein. It will be apparent to those skilled in the art that many modifications, both to materials and methods, may be practiced without departing from the purpose and interest of this invention.

Example 1

The accompanying FIG. 1 illustrates an ice cream bar coated with white and milk chocolate having a marbled appearance. The coating was made in two halves in a mold of polycarbonate whereby each half is made by laying 0.5 mm strips of liquid white and milk chocolate randomly across the mold using movable nozzles whose openings have a diameter of 2 mm. An air stream was blown onto the strips to modify the surface configuration. The chocolate was shelled out by immediately adding liquid chocolate to completely fill the mold, followed by vibrating to remove air bubbles. The mold was then inverted with flirter vibration to create a shell of total thickness of 1.5 to 2 mm. The two halves of the mold were then brought together in such a way that the chocolate shells join together to form a hollow sealed three-dimensional shape. The hollow shape was cooled, and removed from the mold to be placed into a holding device. A probe was used to create a hole at one end of the hollow shell, such that liquid ice cream at −2.5°v C. could be injected into the center. A stick was added, sealed into place with chocolate and the whole product finally cooled at −35° C. to freeze the ice cream.

Example 2

Figure 2:
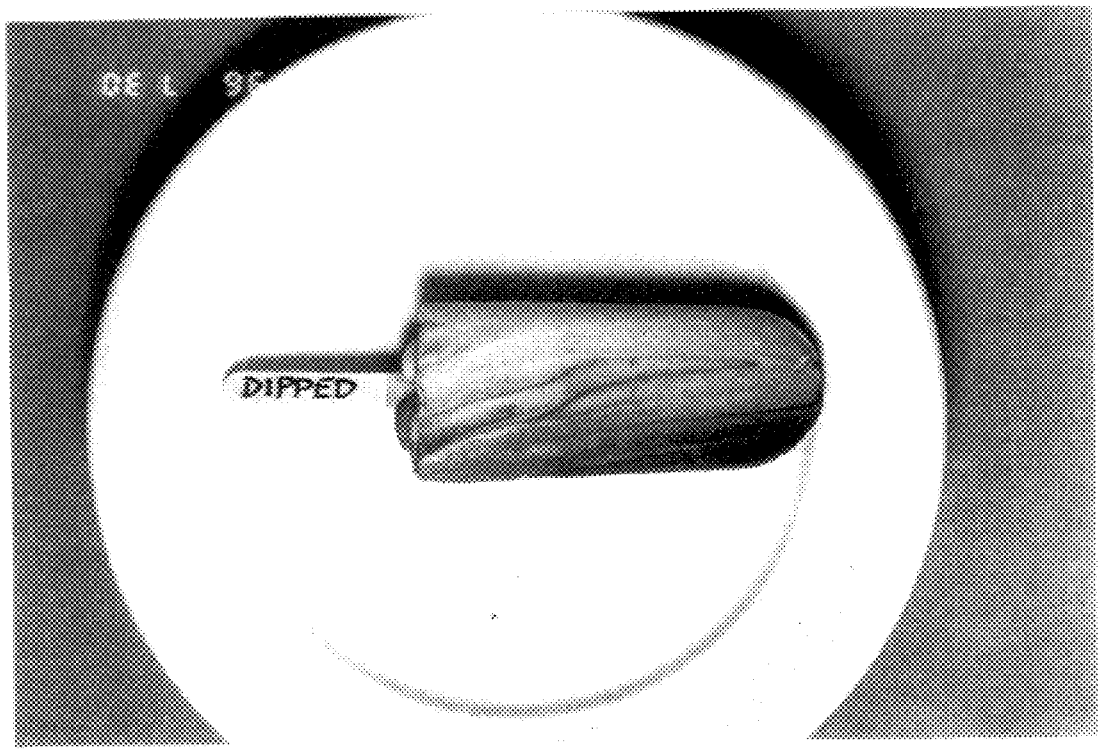
FIG. 2 is a plan view of a dipped appearance embodiment of the present invention.

The accompanying FIG. 2 illustrates an ice cream bar coated with white and milk chocolate having a dipped appearance. The ice cream bar was dipped into a container having a shape that closely follows the contour and volume of the ice cream bar. The coating in the container included two different chocolates, e.g., white chocolate and milk chocolate. The two chocolates were dosed simultaneously through the bottom of the container. The coating of the two chocolates was then allowed to solidify.

Example 3

Figure 3:
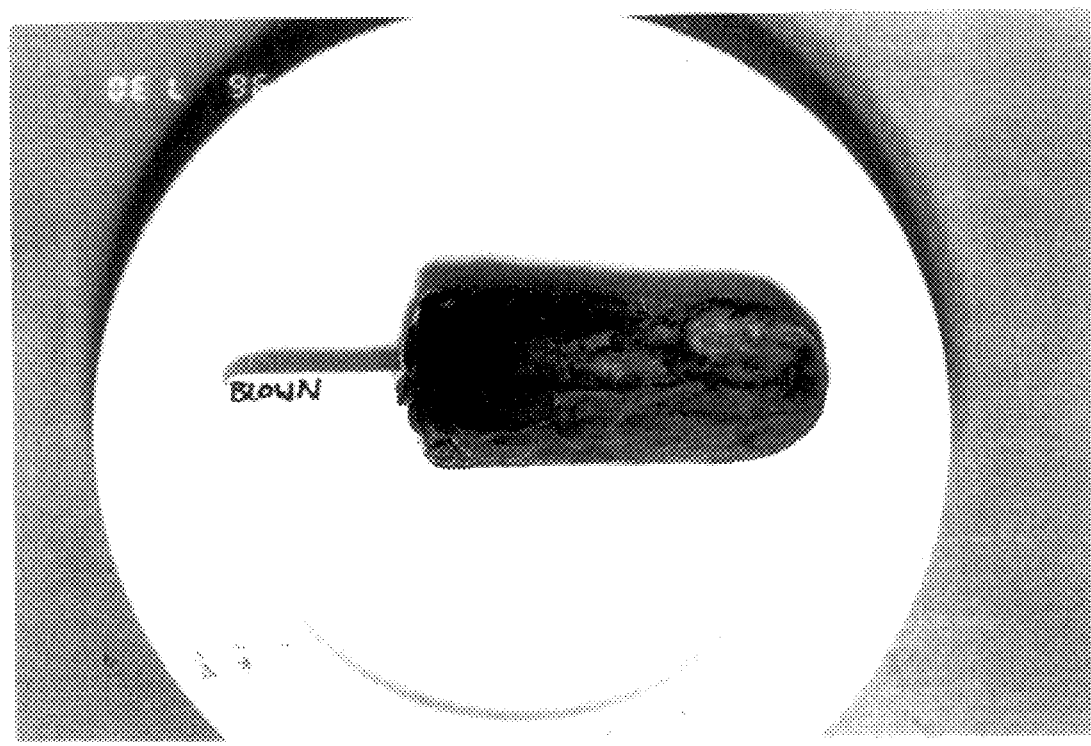
FIG. 3 is a plan view of a blown appearance embodiment of the present invention.

The accompanying FIG. 3 illustrates an ice cream bar coated with white and milk chocolate having a blown appearance. A similar procedure to that described in Example 2 was followed, except that, as the ice cream exited the container and was coated with the white and milk chocolates simultaneously, compressed air was blown across the coated ice cream product.

Example 4

Figure 4:
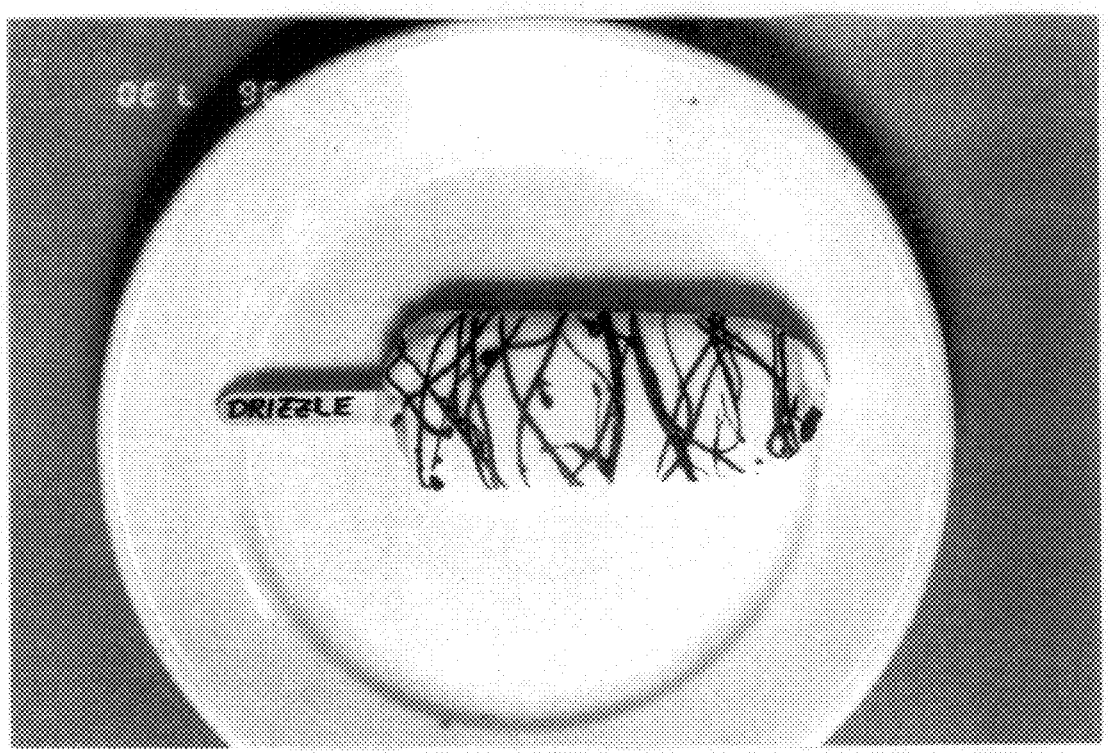
FIG. 4 is a plan view of a drizzle appearance embodiment of the present invention.

The accompanying FIG. 4 illustrates an ice cream bar coated with white and plain chocolate having a drizzle appearance. The ice cream bar was dipped into a white chocolate within a container to coat it with a first layer of white chocolate. The ice cream coated with the first layer of white chocolate was withdrawn from the first container and a continuous stream of a plain chocolate was projected randomly past the coated confectionery product by means of moving spray nozzles operated by a pump generating a pressure of 100 psi. The coating was then solidified.

Example 5

Figure 5:
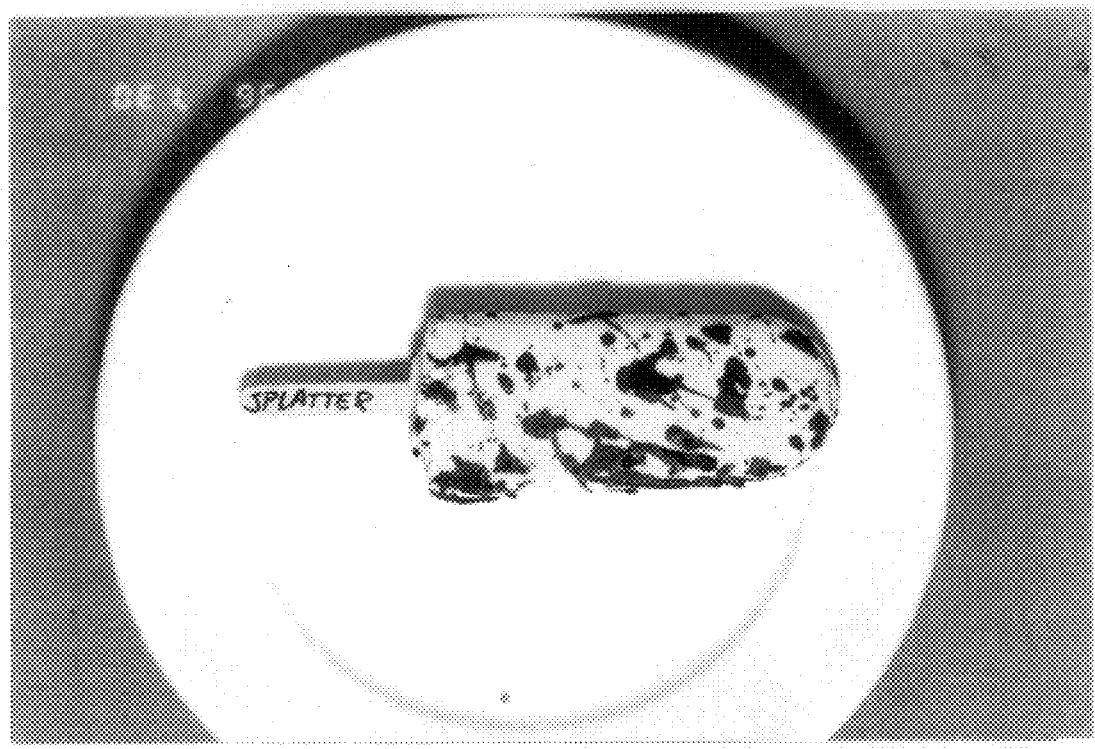
FIG. 5 is a plan view of a splatter appearance embodiment of the present invention.

The accompanying FIG. 5 illustrates an ice cream bar coated with white and plain chocolate having a splatter appearance. A similar procedure to that described in Example 4 was followed, except that the flow of the plain chocolate was interrupted to give a discontinuous stream, which produced a splattered effect.

Example 6

Figures 6, 7:
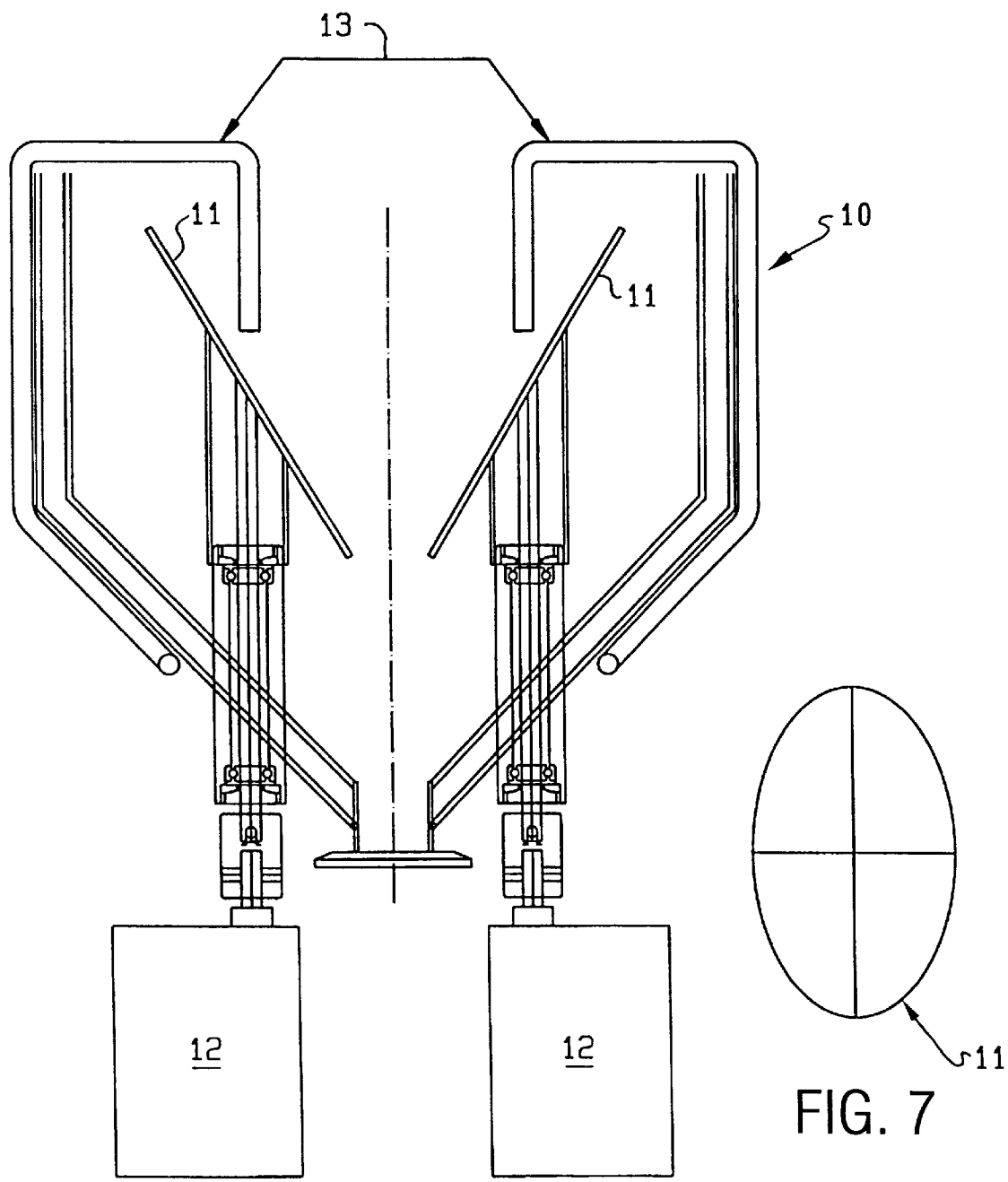
FIG. 6 is an illustration of an apparatus that uses a pair of spinning disks for imparting a striped or spotted coating.
FIG. 7 is a top view of one of the spinning disks of FIG. 6.

The accompanying FIG. 6 illustrates an apparatus for preparing a confectionery product with a chocolate coating having the appearance of either stripes or spots using a pair of spinning disks. The apparatus comprised a jacketed tank (10) made of stainless steel heated to 40° C. by circulating heated water, mounted within which were a pair of elliptically shaped inclined spinning disks (11) made of stainless steel driven separately by a pair of drive motors (12). A top view of one disk (11) is shown in FIG. 7.

In operation, an ice cream bar coated with a first layer of white chocolate (not shown) was passed downwards in the jacketed tank (10) between the spinning disks (11) so that the front and rear faces of the bar face the disks. Milk chocolate was applied to the spinning disks rotating at a speed of from 100 to 2000 rpm by pumping the chocolate from a chocolate source through stainless steel tubing (13) onto the spinning disks and was projected by centrifugal force from the spinning disks onto the front and rear faces of the ice cream bar to give a striped or spotted appearance depending on the speed of the spinning disks. Excess milk chocolate that has been projected by centrifugal force from the spinning disks which did not coat the ice cream bar hit the inside of the tank (10) in a liquid form and then exited the tank for recirculation.

Example 7

The accompanying FIGS. 8–10A illustrate additional devices for preparing a confectionery product with a chocolate coating having a marbled appearance of stripes or dots.

Figure 8:
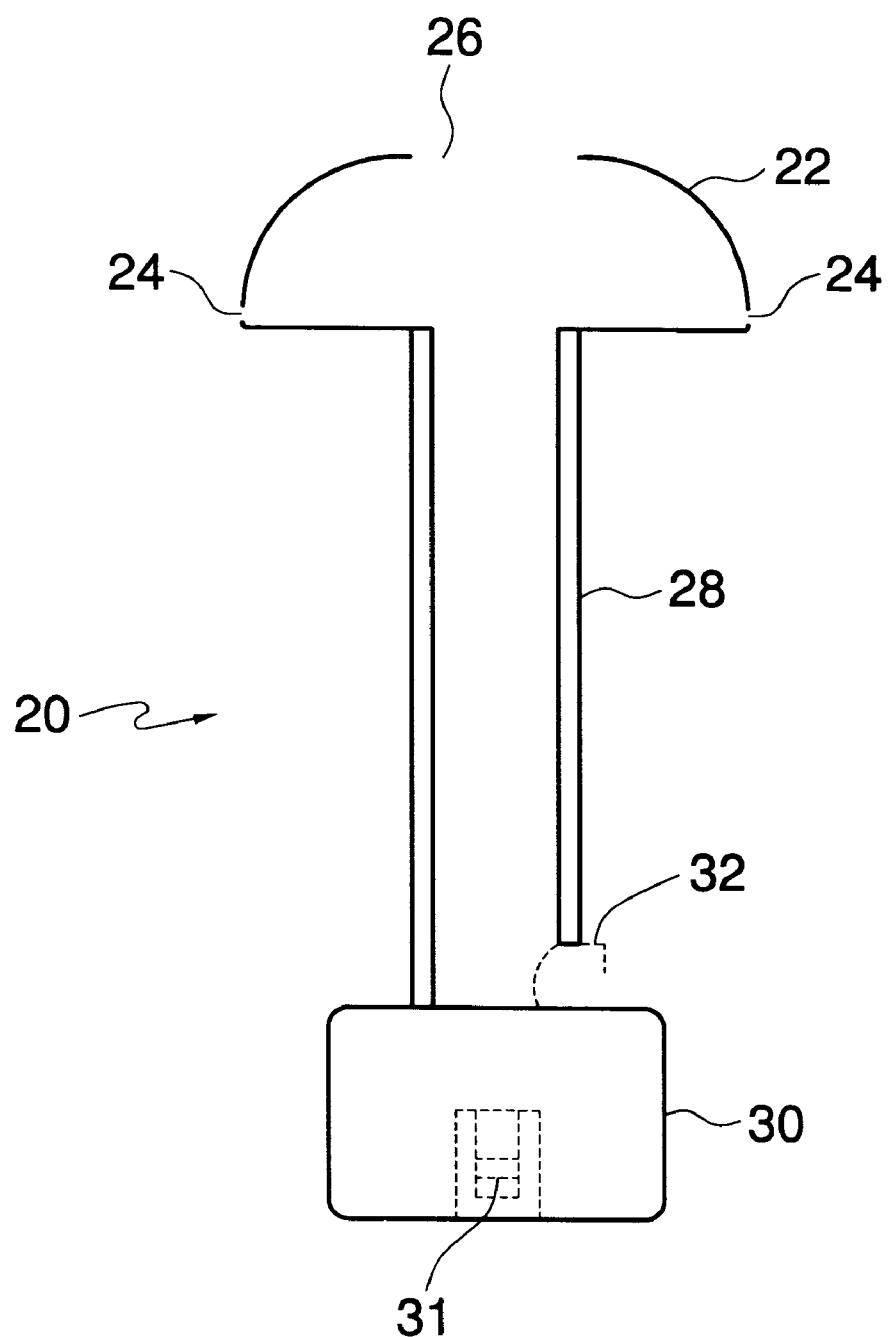
FIG. 8 is a schematic view of a spinning cup device for imparting the desired coating.

FIG. 8 illustrates this device (20) in schematic form. A spinning cup (22) having apertures (24) is used to deposit lines or dots of coating onto an ice cream bar or other confection. The apertures (24) may be spaced to provide a desired coating pattern at a desired speed, and the number of apertures may be altered similarly. Preferably, there are two to six, more preferably four apertures, which are equally spaced. The cup (22) can be used in the apparatus of FIG. 6 in place of the disks, and has an inlet (26) which allows entry of chocolate coating material into the cup (22). The cup (22) is mounted on a hollow shaft (28) connected to a base (30) which is engaged to a motor to spin the device. A drain port (31) is located on the end of the shaft (28) near or in the base (30).

In operation, when coating material is introduced into the cup (22), the material is initially thrown from the holes (24) and onto the confectionery product to form the desired coating. If a small amount of coating material is introduced into the cup, it will be dispensed intermittently to form dots. If a greater amount of coating material is introduced, a continuous amount will be dispensed and the coating will be dispensed as a continuous stripe. The number and size of the stripes or dots of coating material can be selected based on the amount of material introduced, the number and size of the cup apertures (24), the rotation speed of the cup (22), or some combination thereof.

This design eliminates the need to closely monitor or control the flow rate of coating material to each cup (22). Thus, it is preferred that the rotation speed of the cup (22) be maintained at least substantially constant. The cups (22) maintain an essentially constant volume of coating material, with excess material exiting the cup (22) through the hollow shaft (28) and the exit port (32). This provides a number of advantages, for example:

(1) the flow of coating material to individual cups can vary excessively without effecting the flow of coating material to the product;

(2) the minimum supply flow only needs to be adequate to partially fill the cup, although fully flooding the cup will enable a uniform continuous flow of coating material to the product; and (3) the design allows product flexibility in that the number, orientation and size of the cup apertures (24) can be varied as desired.

When a plurality of spinning cups are utilized, individual cups can be geared in order to vary the distance from the cup axes to the product surface. This allows product patterns to be changed by simply changing the distance between the cups. For full cup designs, the distance from the cup to the product is fixed based on the distance between the cups.

Figure 9:
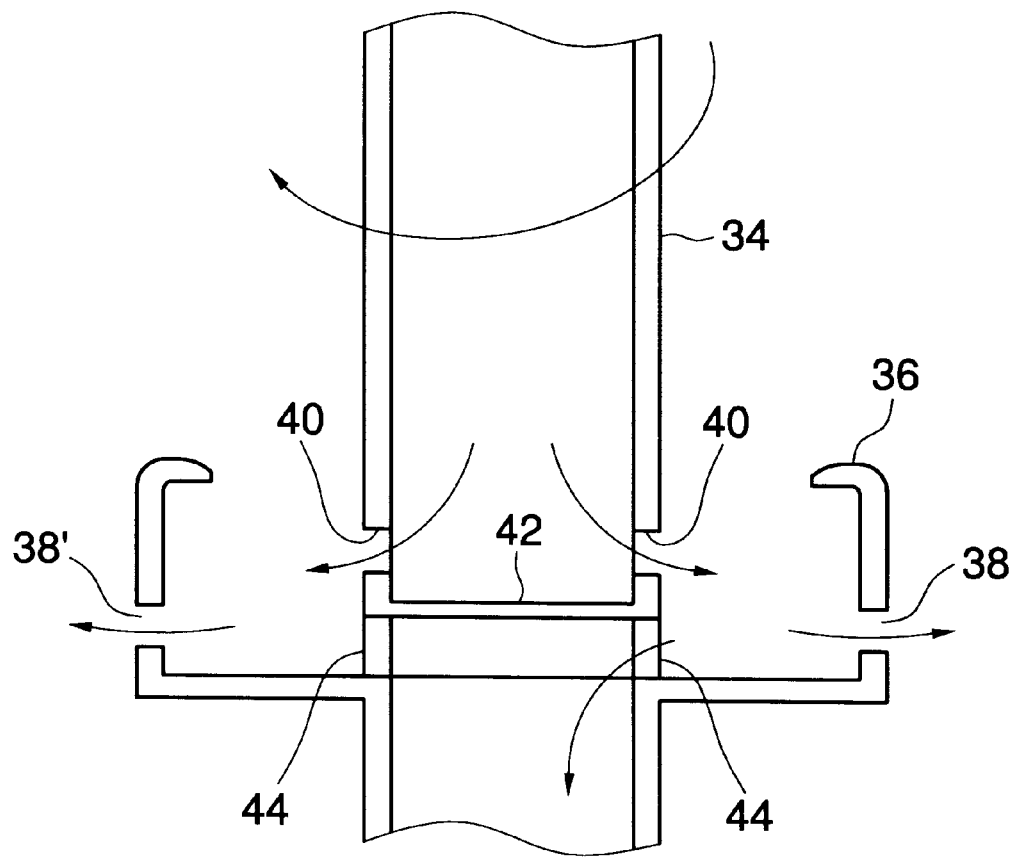
FIGS. 9 and 10 are side views of a hollow tube design for applying the coating.

FIG. 9 illustrates a variation of the rotating cup design, where coating material is introduced through a rotating hollow tube (34). The cup (36) is formed about the tube and includes dispensing ports (38) as in the previous design of FIG. 8. The hollow tube (34) also includes a central closure (42) and apertures (40) which allow coating material to enter into the cup. Excess coating material can exit the cup through apertures (44) back into hollow tube (34) to be returned to the supply of coating material for re-use. Also, one or more additional cups may be disposed on the hollow tube (34) above or below the cup (36) to permit different coating materials to be supplied to the confectionery.

Figure 10A:
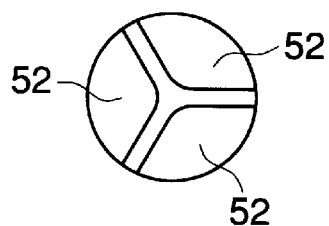
FIG. 10A is a cross-sectional view of the device of FIG. 10 to illustrate compartments therein.
Figure 10:
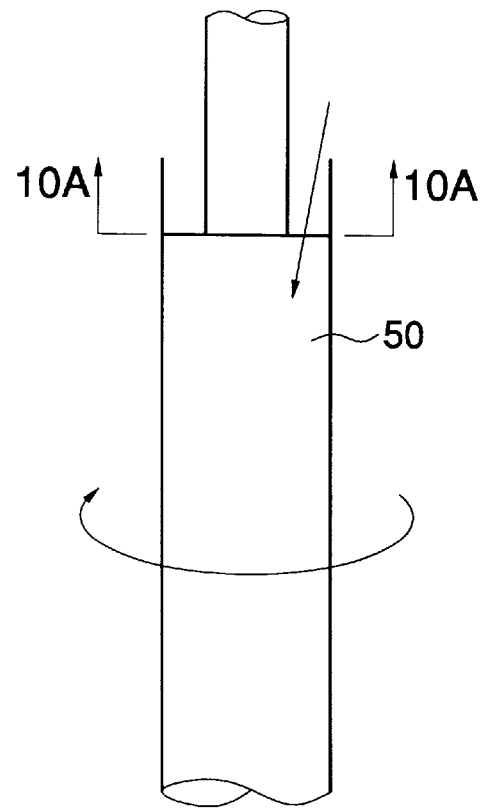
Figure 10:
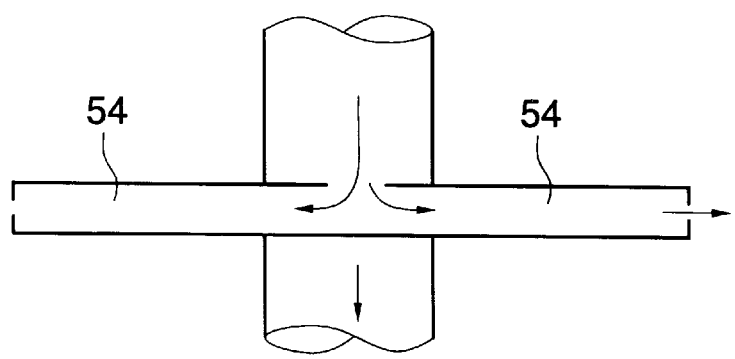

Instead of a cup design, a rotating tube design such as that shown in FIG. 10 can be used. The coating enters a first hollow tube (50). If desired, this tube can be segmented into compartments (52), such as with a divider, as shown in FIG. 10A, to allow different coating materials to be applied. Each compartment includes an exit pipe (54), mounted perpendicularly to the hollow tube (50), to dispense coating material. Excess coating material can pass through the hollow tube (50) to be returned to the coating supply.

The exit pipes can be as long or as short as necessary to dispense coating material in a desired pattern. In the simplest embodiment, the pipes can be eliminated so that only apertures in the sidewall of the hollow tube (50) are needed to dispense the coating material. In this design, the spacing between the hollow tube and other hollow tubes or parts of the apparatus can be reduced compared to that of the spinning cups. Even when exit pipes are used, the pipes may be staggered between adjacent devices to minimize the spacing between devices. The speed and motion control of each tube can be varied to achieve different coating patterns on the product, although these are preferably maintained at a substantially constant speed and the control is handled by the size and number of apertures or exit pipes.

Although preferred embodiments of the invention have been described in the foregoing description, it will be understood that the invention is not limited to the specific embodiments disclosed herein but is capable of numerous modifications by one of ordinary skill in the art. It should be understood that the materials used and the mechanical details may be slightly different or modified from the descriptions herein without departing from the methods and compositions disclosed and taught by the present invention as recited in the claims.

What is claimed is:

1. A chocolate coating apparatus comprising:
   a supply of chocolate;
   at least one feed device for supplying the chocolate;
   at least one positioning device for receiving the chocolate from the at least one feed device and for centrifugally directing the chocolate onto a confectionery in a desired patterned arrangement as a coating, wherein the at least one positioning device directs the chocolate onto the confectionery which moves relative to the at least one positioning device; and
   an enclosure surrounding the positioning device so as to capture excess chocolate that does not remain on the confectionery.

2. The apparatus of claim 1, further comprising at least one powered device for rotating each coating positioning device at a desired speed.

3. The apparatus of claim 2, wherein the positioning device is capable of being rotated at a speed of about 50 rpm to 2,500 rpm.

4. The apparatus of claim 1, wherein two feed devices are used for supplying two different types of chocolate.

5. The apparatus of claim 1, wherein the positioning device comprises at least one rotatable disk.

6. The apparatus of claim 5, wherein each rotatable disk comprises a substantially ellipsoidal or substantially circular shape.

7. The apparatus of claim 5, wherein the feed device supplies chocolate at an angle to the rotatable disk.

8. The apparatus of claim 1, wherein the positioning device comprises at least one rotatable pipe.

9. The apparatus of claim 1, wherein the positioning device comprises a rotatable cup having a plurality of apertures for directing the chocolate onto the confectionery.

10. The apparatus of claim 9, wherein the positioning device includes an overflow channel to facilitate recirculation of chocolate coating that does not pass through the apertures.

11. The apparatus of claim 1, wherein the positioning device further comprises a metering device to control the output of chocolate coating.

12. The apparatus of claim 1, wherein the positioning device comprises a divider to maintain the separation of different chocolate types for application to the confectionery.

13. The apparatus of claim 1, wherein the positioning device is capable of providing a discontinuous flow of chocolate.

14. The apparatus of claim 1, further comprising a coating modifying device for blowing an air stream onto the chocolate coating to modify its appearance.

15. The apparatus of claim 1, further comprising a coating modifying device for dragging at least one probe across the chocolate coating for forming surface impressions to give random or streaked effects on the coating.

16. The apparatus of claim 1, wherein the enclosure comprises a heating device for heating the chocolate to a temperature from about 28° C. to 60° C., thereby facilitating application and recirculation of the chocolate.

17. A chocolate coating apparatus comprising:

a chocolate supply means;

feed means for supplying the chocolate;

at least one positioning means for receiving the chocolate from the feed means and for centrifugally directing the chocolate onto a confectionery in a desired patterned arrangement as a coating, wherein the at least one positioning means directs the chocolate onto the confectionery which moves relative to the at least one positioning means; and recirculation means surrounding the positioning means so as to capture excess chocolate that does not remain on the confectionery.

18. The apparatus of claim 17, wherein the feed means supplies two different types of chocolate coatings without combining the two coatings.

19. The apparatus of claim 17, wherein the positioning means comprises a rotatable disk to facilitate directing the chocolate onto the confectionery.

20. The apparatus of claim 17, wherein the positioning means comprises a rotatable cup having apertures therein to facilitate directing the chocolate onto the confectionery.

21. The apparatus of claim 17, wherein the positioning means comprises a rotatable pipe having apertures therein to facilitate directing the chocolate onto the confectionery.

22. The apparatus of claim 17, wherein the recirculation means comprises an enclosure disposed about the positioning means to contain the chocolate therein.

* * * * *